(12) United States Patent
Watanabe et al.

(10) Patent No.: US 11,153,543 B2
(45) Date of Patent: Oct. 19, 2021

(54) ILLUMINATING APPARATUS

(71) Applicant: MAXELL, LTD., Kyoto (JP)

(72) Inventors: Katsuyuki Watanabe, Kyoto (JP); Koji Fujita, Kyoto (JP); Nobuyuki Kaku, Kyoto (JP)

(73) Assignee: MAXELL, LTD., Kyoto (JP)

(*) Notice: Subject to any disclaimer, the term of this patent is extended or adjusted under 35 U.S.C. 154(b) by 0 days.

(21) Appl. No.: 16/485,638

(22) PCT Filed: Mar. 1, 2017

(86) PCT No.: PCT/JP2017/008130
§ 371 (c)(1),
(2) Date: Aug. 13, 2019

(87) PCT Pub. No.: WO2018/158885
PCT Pub. Date: Sep. 7, 2018

(65) Prior Publication Data
US 2019/0362659 A1 Nov. 28, 2019

(51) Int. Cl.
*H04N 9/31* (2006.01)
*G09G 3/00* (2006.01)
(Continued)

(52) U.S. Cl.
CPC .......... *H04N 9/3194* (2013.01); *G06F 3/011* (2013.01); *G09G 3/002* (2013.01); *G09G 3/32* (2013.01);
(Continued)

(58) Field of Classification Search
CPC .. G09G 3/002; G09G 3/32; G09G 2320/0626; G09G 2320/066;
(Continued)

(56) References Cited

U.S. PATENT DOCUMENTS

2006/0290905 A1* 12/2006 May ..................... H04N 5/7458
353/122
2007/0011196 A1* 1/2007 Ball ................. H04N 21/44218
(Continued)

FOREIGN PATENT DOCUMENTS

JP 2006-086024 A 3/2006
JP 2015-022201 A 2/2015
(Continued)

OTHER PUBLICATIONS

International Search Report issued in corresponding International Patent Application No. PCT/JP2017/008130, dated May 23, 2017, with English Translation.

*Primary Examiner* — John W Miller
*Assistant Examiner* — Humam M Satti
(74) *Attorney, Agent, or Firm* — McDermott Will & Emery LLP

(57) ABSTRACT

An illuminating apparatus with a video projecting function suitable for a digital signage or the like, which has an excellent video displaying function and better usability for a user is provided. An illuminating apparatus includes: an illumination light source disposed in a housing and configured to generate illumination light; a video projecting apparatus disposed in the housing, the video projecting apparatus being configured to generate video light, the video light from the video projecting apparatus being projected into an illumination light area from the illumination light source; a motion detector configured to detect approach of a human body; and a controller configured to control an operation of at least one or both of the illumination light source and the video projecting apparatus on a basis of a detection signal from the motion detector, the controller being configured to adjust brightness of the illumination light from the illumination light source.

18 Claims, 15 Drawing Sheets

(51) Int. Cl.
  *G09G 3/32*    (2016.01)
  *G06F 3/01*    (2006.01)
  *H05B 47/10*   (2020.01)
(52) U.S. Cl.
  CPC ....... *H05B 47/10* (2020.01); *G09G 2320/066* (2013.01); *G09G 2320/0626* (2013.01)
(58) Field of Classification Search
  CPC ...... G09G 2354/00; G09G 3/22; G06F 3/011; H04N 5/74; H04N 5/7408; H04N 5/7475; H04N 9/31–9/3144; H04N 9/3173; H04N 9/3194; H04N 9/3141; H04N 9/3155; H05B 47/10; Y02B 20/40; F21S 2/00; F21S 8/04; F21V 23/00; F21V 33/00; G03B 21/00
  USPC .......................... 348/602, 687, 744, 552, 673
  See application file for complete search history.

(56) References Cited

U.S. PATENT DOCUMENTS

| | | | |
|---|---|---|---|
| 2012/0092630 A1* | 4/2012 | Furuichi | G03B 21/14 353/98 |
| 2014/0035964 A1* | 2/2014 | Kasuga | H05B 45/00 345/690 |
| 2014/0380252 A1 | 12/2014 | Tanaka et al. | |
| 2015/0022788 A1 | 1/2015 | Shinha et al. | |
| 2017/0352248 A1* | 12/2017 | Shimizu | G08B 21/185 |

FOREIGN PATENT DOCUMENTS

| | | |
|---|---|---|
| JP | 2015-125801 A | 7/2015 |
| JP | 2016-133799 A | 7/2016 |
| WO | 2013/099407 A1 | 7/2013 |
| WO | 2016/104191 A1 | 6/2016 |

* cited by examiner

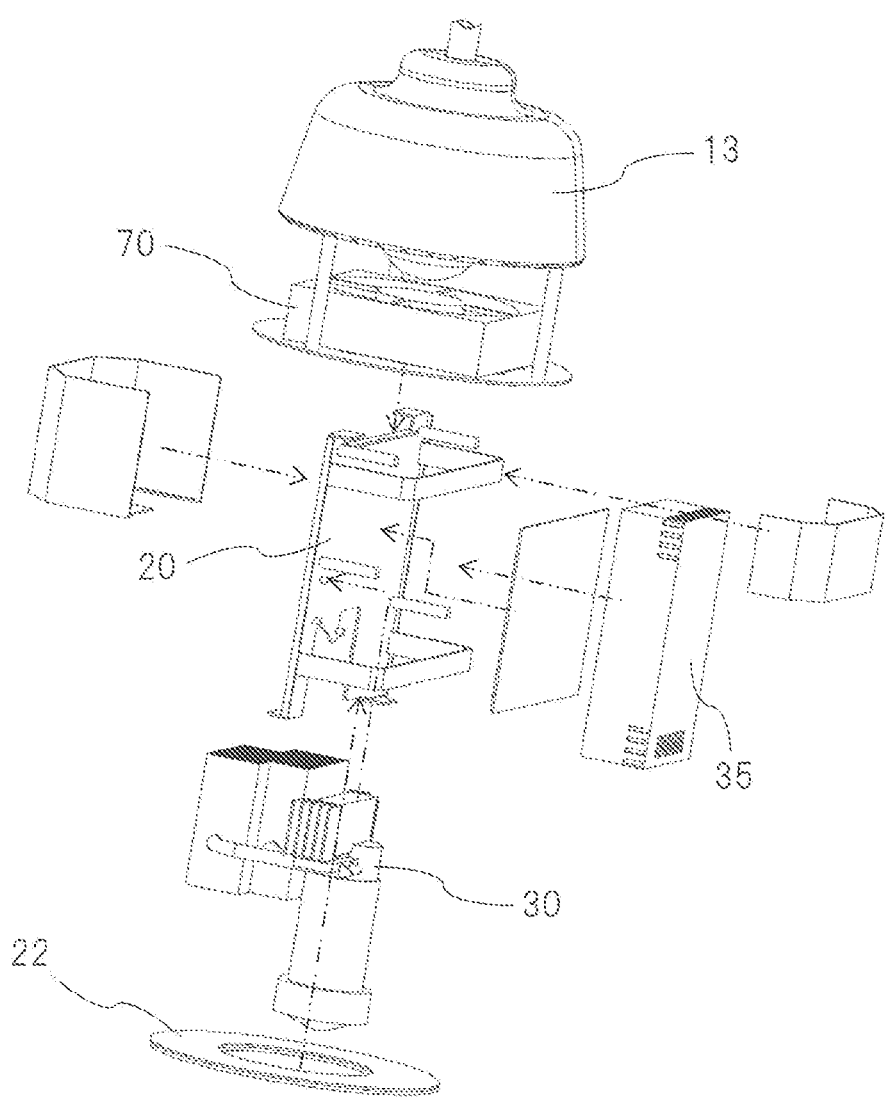

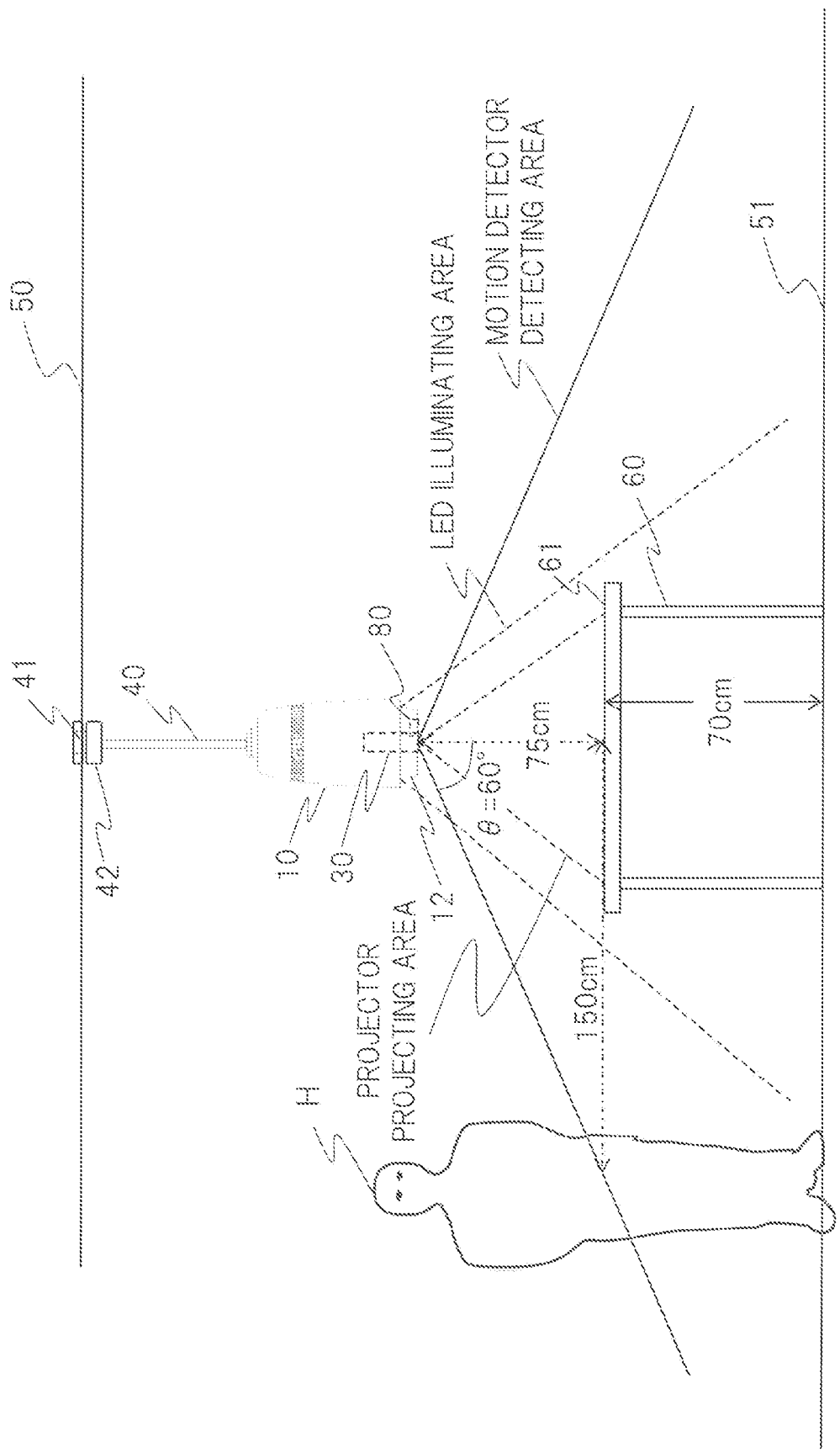

ILLUMINATING APPARATUS

CROSS REFERENCE

This application is the U.S. National Phase under 35 U.S.C. § 371 of International Application No. PCT/JP2017/008130, filed on Mar. 1, 2017, the entire contents are hereby incorporated by reference.

TECHNICAL FIELD

The present invention relates to an illuminating apparatus.

BACKGROUND ART

As lighting equipment installed in a ceiling for usage, for example, according to Patent Document 1 below, it has already been known that a video display device such as a projector is integrally provided in a housing thereof, and motion video such as a TV program is allowed to be displayed after illumination is turned OFF, whereby a space in a translucent glove is used more effectively. Moreover, according to Patent Document 2 below, a technique of lighting equipment equipped with a so-called motion detector, which causes a light source to be turned on or off in accordance with a detection result of the motion detector, by which a detection range of the motion detector is hardly out of person's whereabouts is disclosed.

RELATED ART DOCUMENTS

Patent Documents

Patent document 1: Japanese Patent Application Publication No. 2006-86024
Patent document 2: Japanese Patent Application Publication No. 2015-125801

SUMMARY OF THE INVENTION

Problems to be Solved by the Invention

However, Patent Document 1 discloses that display such as motion video from the projector is projected and displayed onto an inner surface of the translucent glove after the illumination is turned OFF. But, Patent Document 1 fails to disclose that illumination light is appropriately adjusted and controlled in accordance with video light from a video display device such as a projector.

Further, Patent Document 2 discloses that the detection range of the motion detector is caused to be hardly out of person's whereabouts by setting an installation location of the motion detector to a periphery of an area where the light source is not provided. But, Patent Document 2 fails to disclose that illumination light is appropriately adjusted and controlled in accordance with video light from a video display device such as a projector.

Namely, in the conventional technique, a problem that may occur when a projector is integrally incorporated with lighting equipment has not been considered sufficiently yet. This problem will be described later in detail.

It is thus an object of the present invention to solve the problem that may occur when a projector is integrally incorporated with lighting equipment, and to provide an illuminating apparatus with a video projecting function, which has an excellent video displaying function and better usability for a user.

Means for Solving the Problem

As one aspect for achieving the above object, for example, there is provided an illuminating apparatus including: an illumination light source disposed in a housing, the illumination light source being configured to generate illumination light; a video projecting apparatus disposed in the housing, the video projecting apparatus being configured to generate video light, the video light from the video projecting apparatus being projected into an illumination light area from the illumination light source; a motion detector configured to detect approach of a human body; and a controller configured to control an operation of at least one or both of the illumination light source and the video projecting apparatus on a basis of a detection signal from the motion detector, the controller being configured to adjust brightness of the illumination light from the illumination light source and brightness of an image projected from the video projecting apparatus.

Effects of the Invention

According to the present invention, it becomes possible to solve a problem that may occur when a projector is integrally incorporated with lighting equipment, and to provide an illuminating apparatus with a video projecting function suitable for a digital signage or the like, which has an excellent video displaying function and better usability for a user.

BRIEF DESCRIPTIONS OF THE DRAWINGS

FIG. 1 is a perspective view illustrating an illuminating apparatus with a video projecting function according to a first embodiment of the present invention together with its usage environment;

FIGS. 2(A) and 2(B) are respectively a side view and a bottom view illustrating one example of a layout (that is, an external configuration) of the illuminating apparatus with the video projecting function according to the first embodiment of the present invention;

FIG. 3 is a development perspective view of an internal configuration illustrating one example of an internal configuration of the illuminating apparatus with the video projecting function according to the first embodiment of the present invention;

FIG. 4 is a view for explaining a relationship between an illumination area of illumination light and projected video with respect to arrangement and settings of a motion detector of the illuminating apparatus with the video projecting function according to the first embodiment of the present invention;

Figure 7:
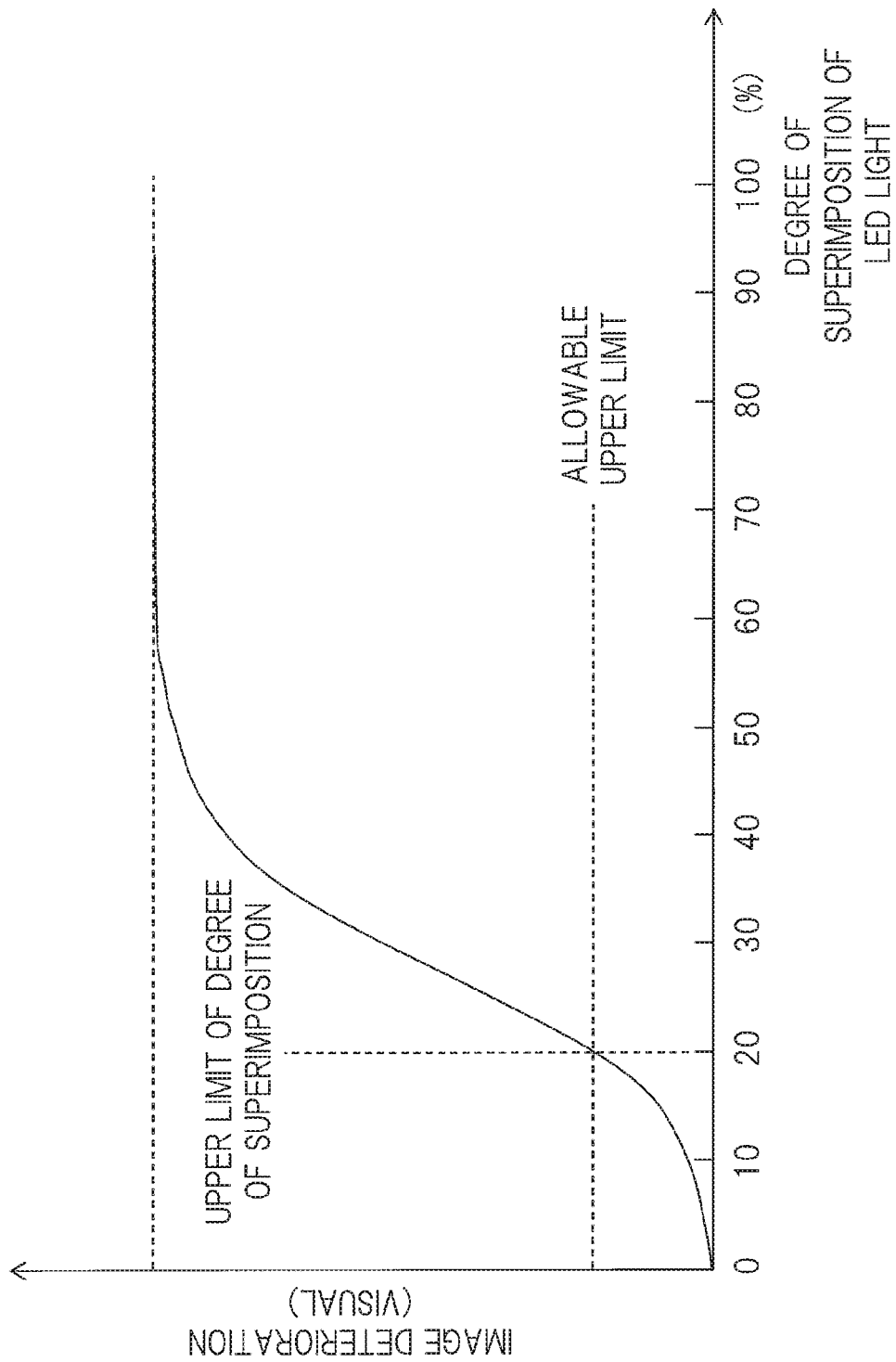
Figure 8:
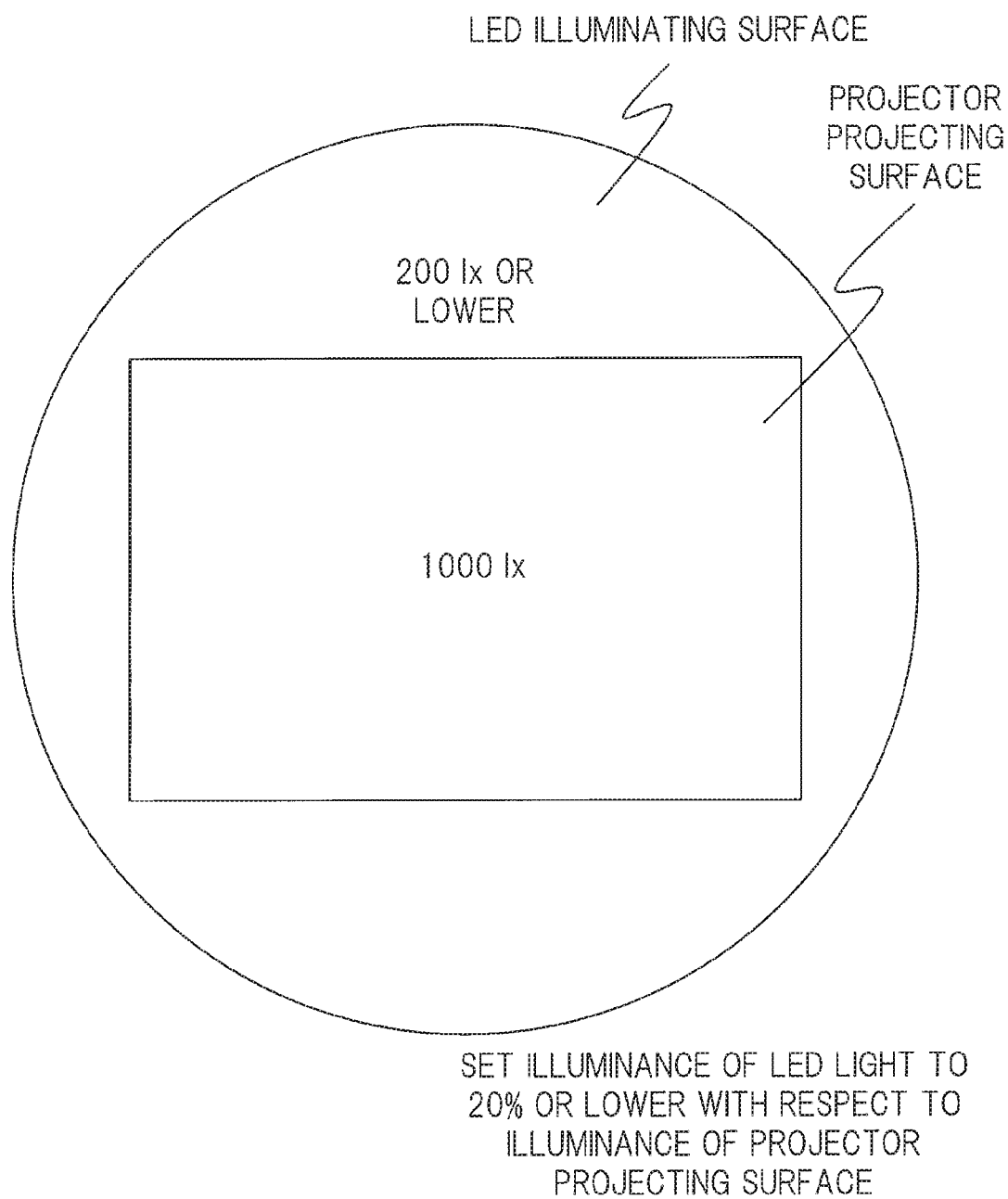
Figure 9:
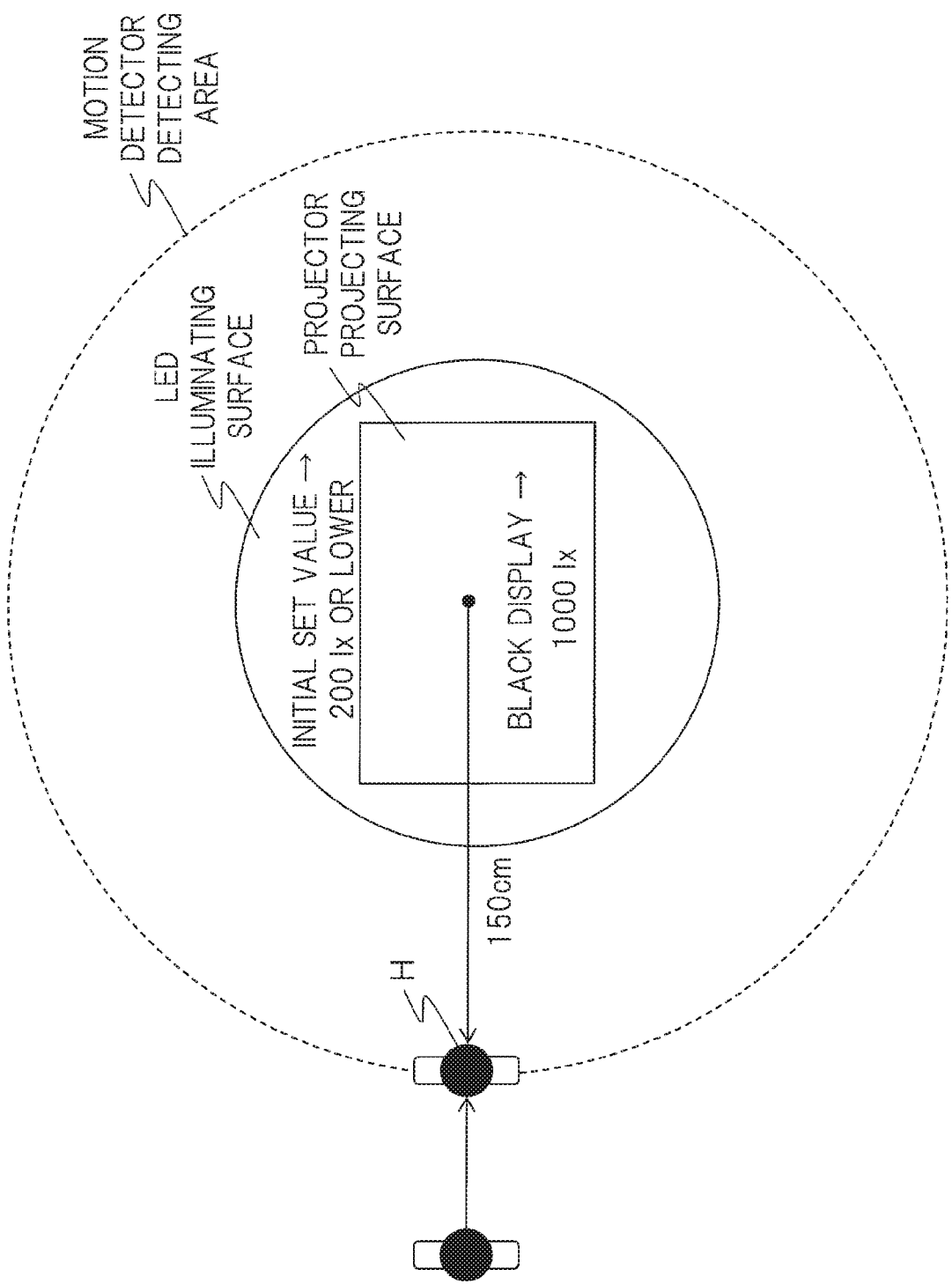
Figure 10:
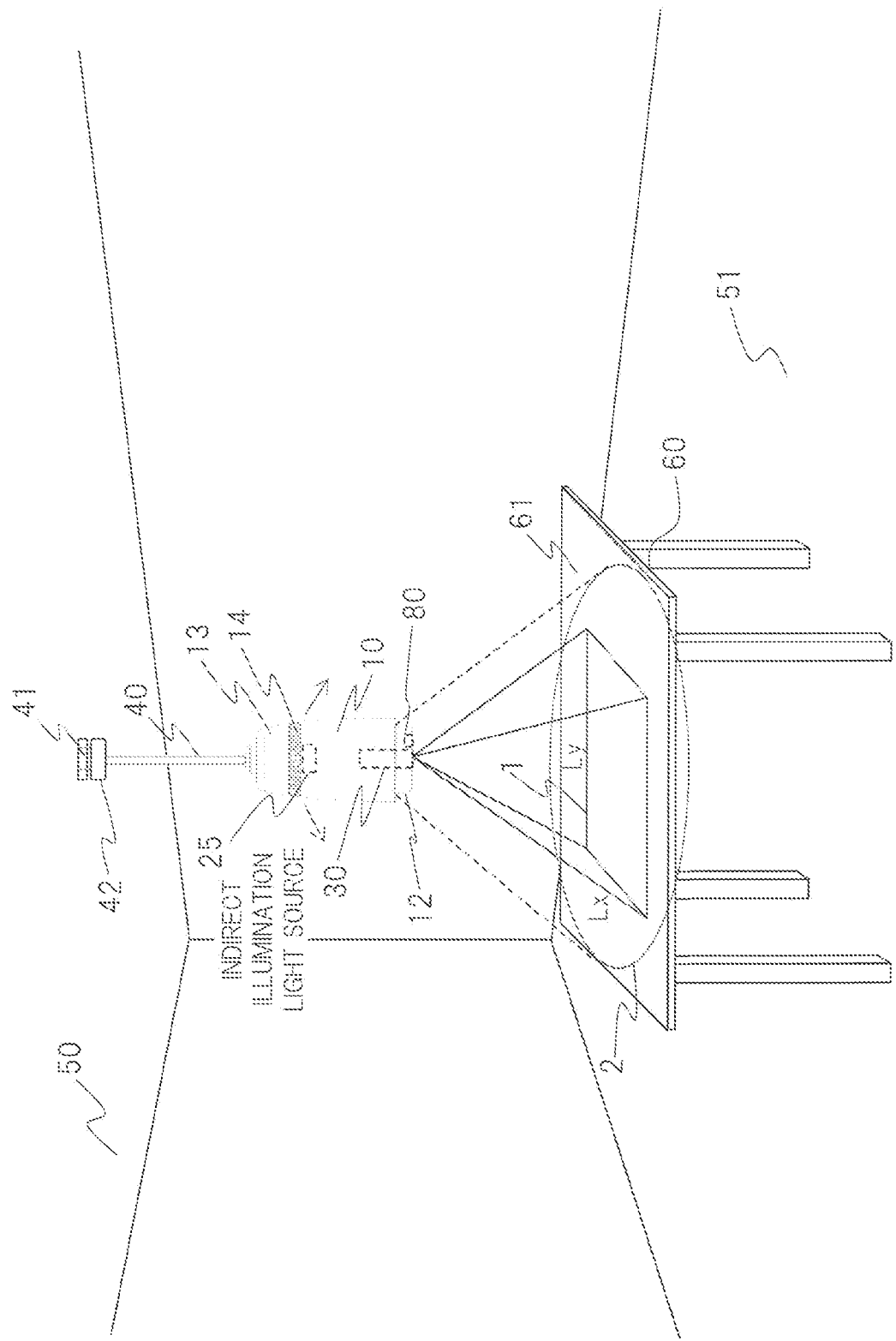
Figure 11:
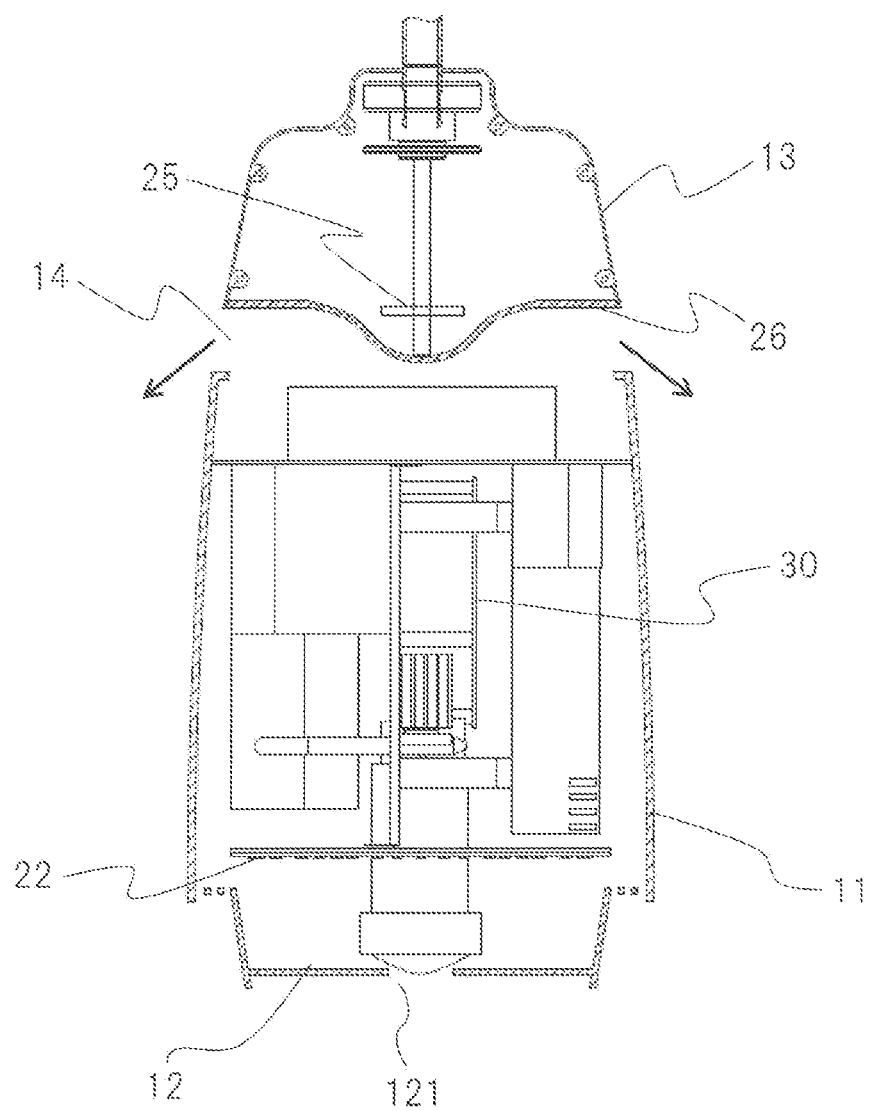
Figure 12:
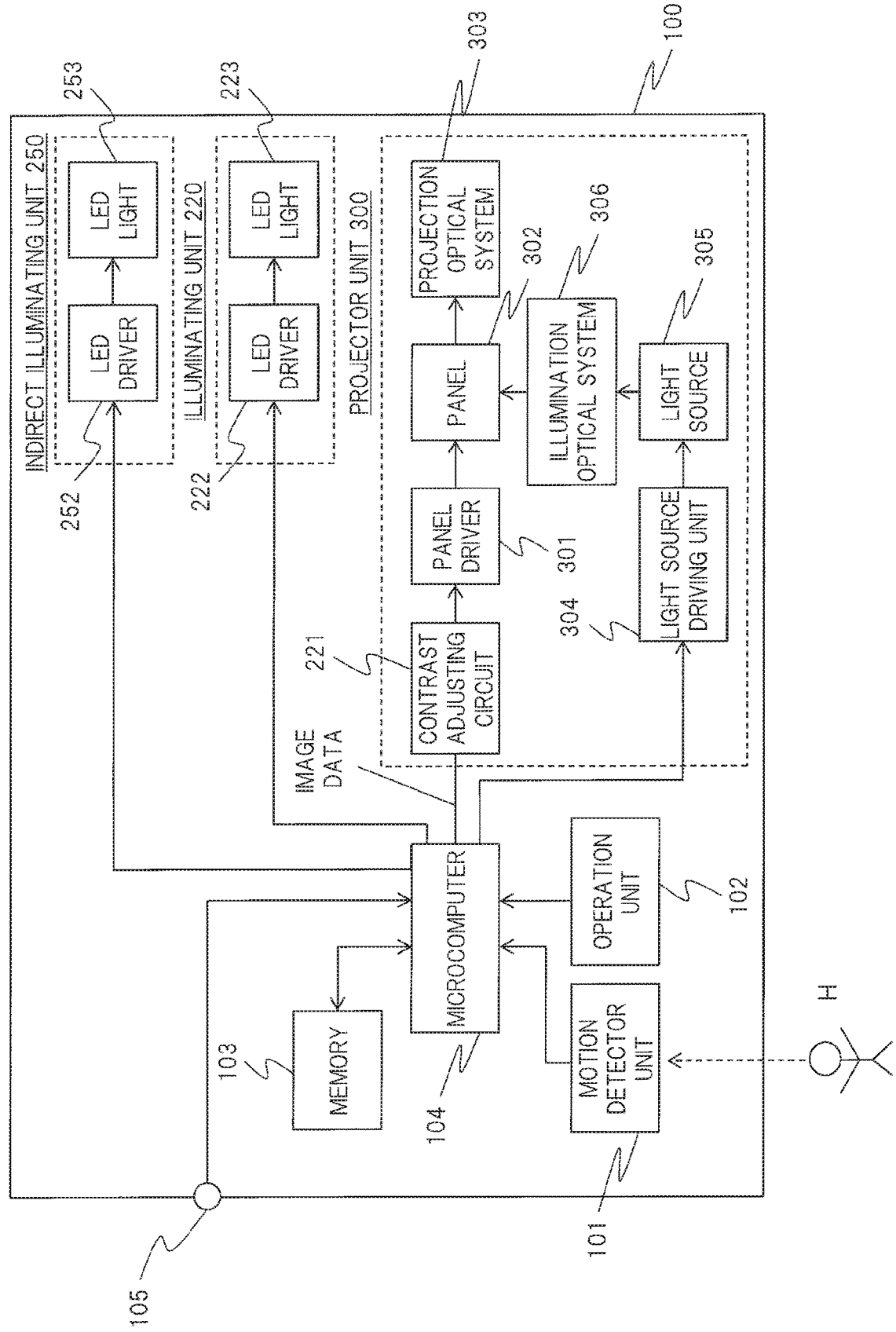
Figure 13B:
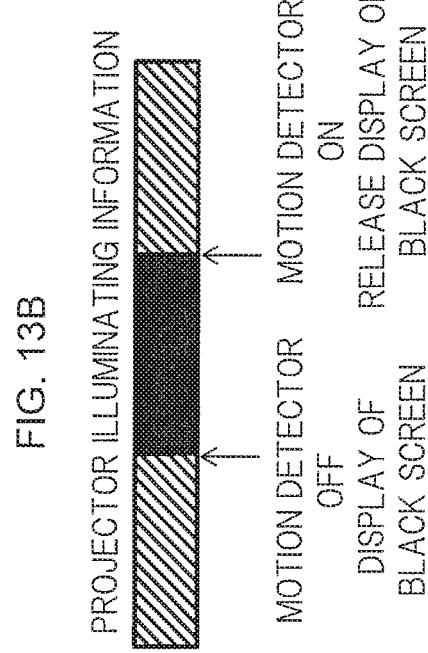
Figure 13A:
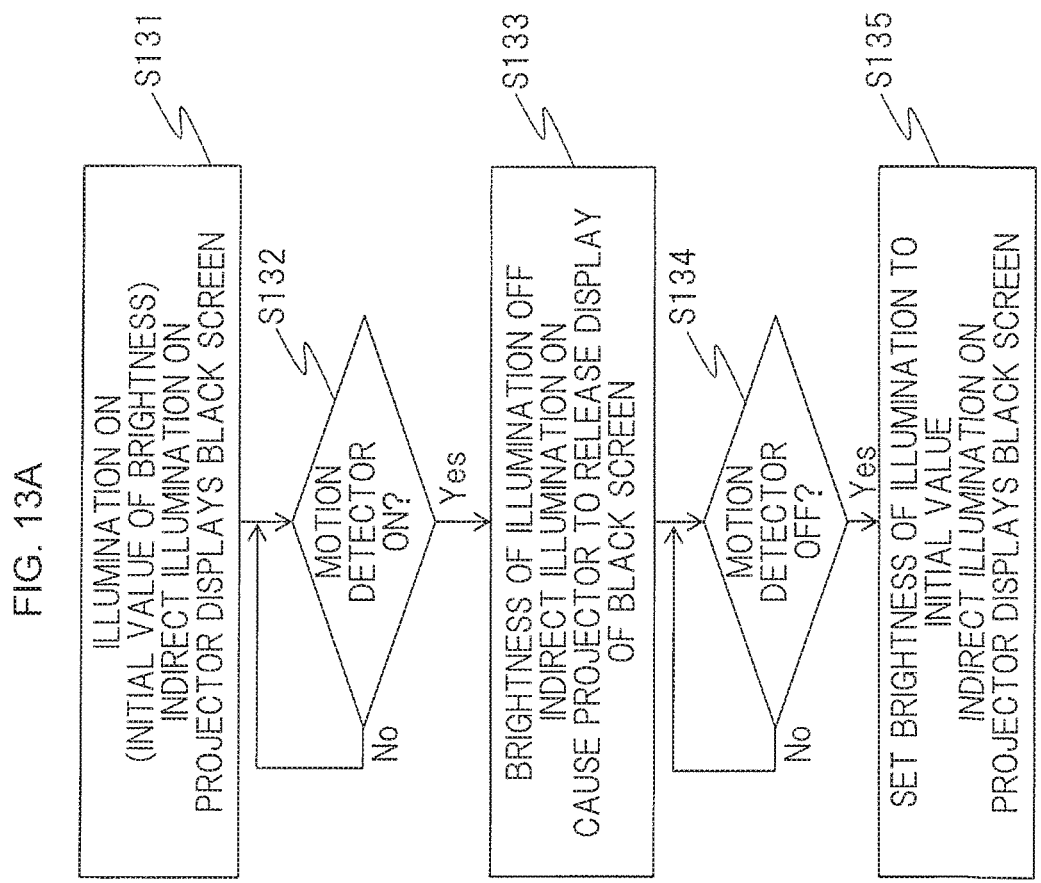
Figure 14:
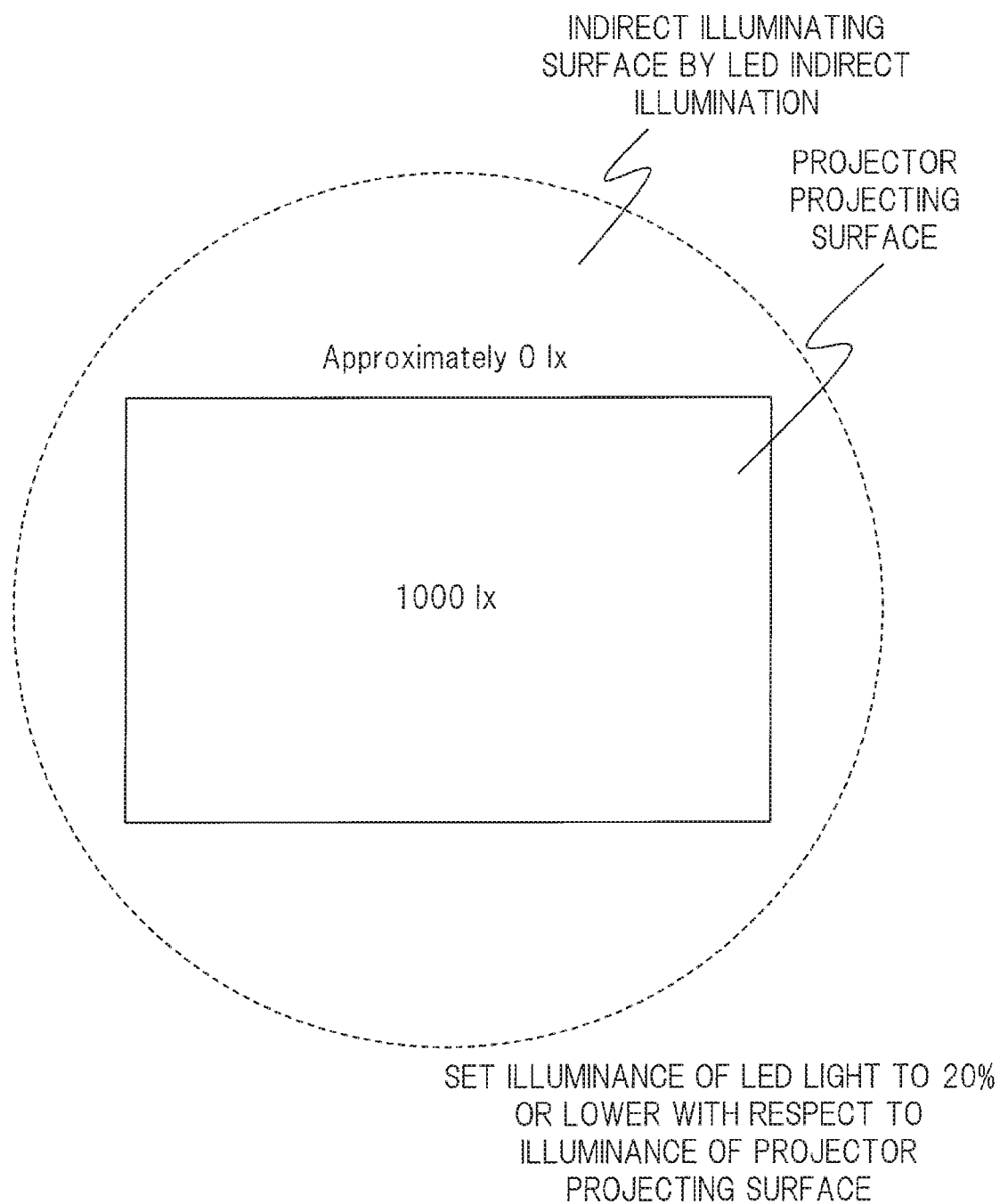
Figure 15:
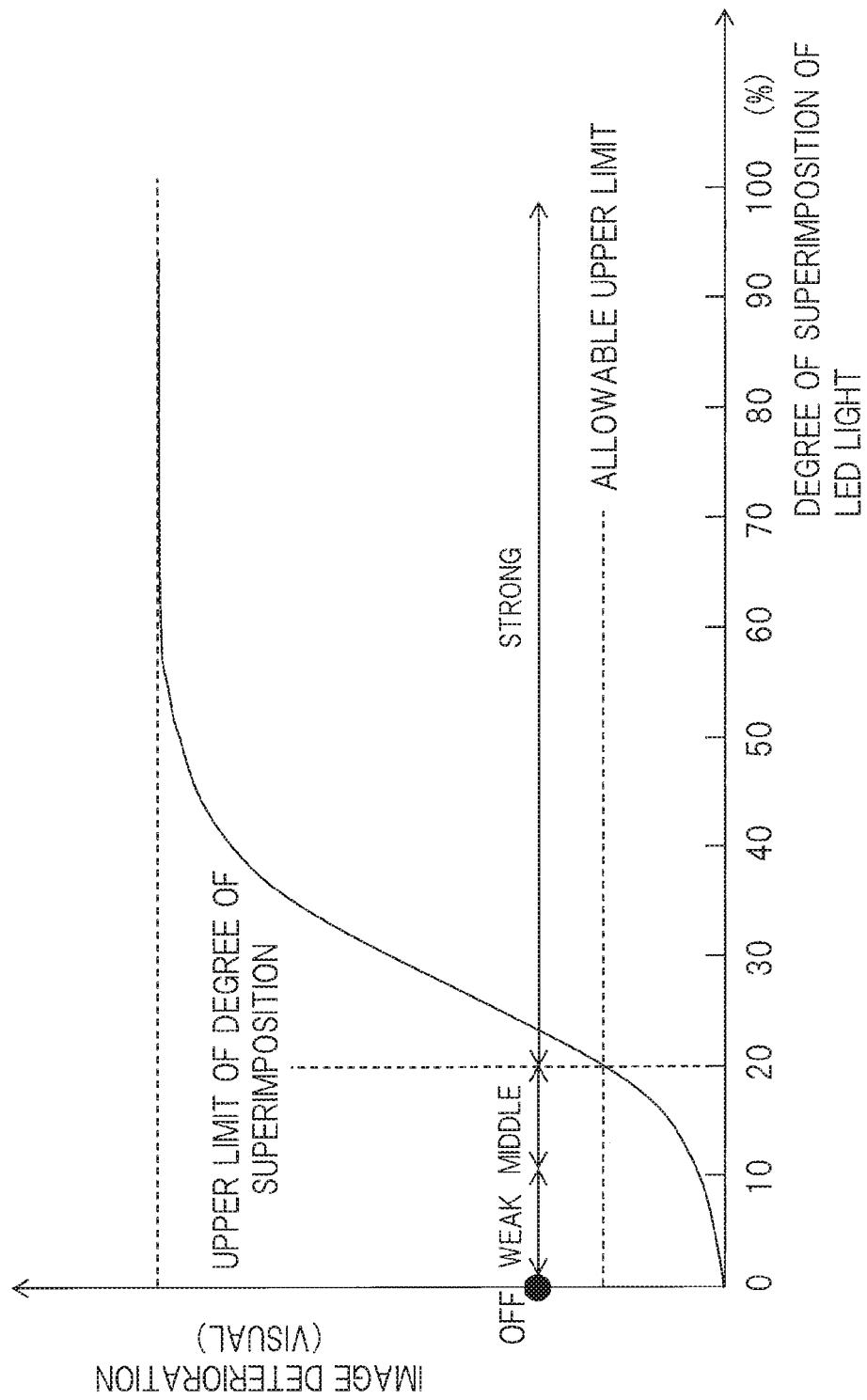

FIGS. 6(A) and 6(B) are explanatory drawings for an operation including a flow for explaining the operation of the illuminating apparatus with the video projecting function according to the first embodiment of the present invention;

FIG. 7 is a view for explaining a degree of superimposition of LED light in the illuminating apparatus with the video projecting function according to the first embodiment of the present invention;

FIG. 8 is a view illustrating one example of a projector projecting surface and an LED illuminating surface obtained by the illuminating apparatus with the video projecting function according to the first embodiment of the present invention;

FIG. 9 is a view illustrating a change in brightness of the projector projecting surface and a change in brightness of the LED light in the illuminating apparatus with the video projecting function according to the first embodiment of the present invention in a case where a human body enters a motion detecting area;

FIG. 10 is a perspective view illustrating an illuminating apparatus with a video projecting function according to a second embodiment of the present invention together with usage environment thereof;

FIG. 11 is a sectional side view illustrating one example of a layout (that is, an external configuration) of the illuminating apparatus with the video projecting function according to the second embodiment of the present invention;

FIG. 12 is a block diagram illustrating one example of a controller for controlling an operation of the illuminating apparatus with the video projecting function according to the second embodiment of the present invention;

FIGS. 13(A) and 13(B) are explanatory drawings for an operation including a flow for explaining the operation of the illuminating apparatus with the video projecting function according to the second embodiment of the present invention;

FIG. 14 is a view illustrating one example of a projector projecting surface and an LED illuminating surface obtained by the illuminating apparatus with the video projecting function according to the second embodiment of the present invention; and FIG. 15 is a view for explaining a degree of superimposition and contrast correction of LED indirect illumination in the illuminating apparatus with the video projecting function according to the second embodiment of the present invention.

DETAILED DESCRIPTION OF PREFERRED EMBODIMENTS

Hereinafter, embodiments of the present invention will be described in detail with reference to the accompanying drawings.

First Embodiment

Figure 1:
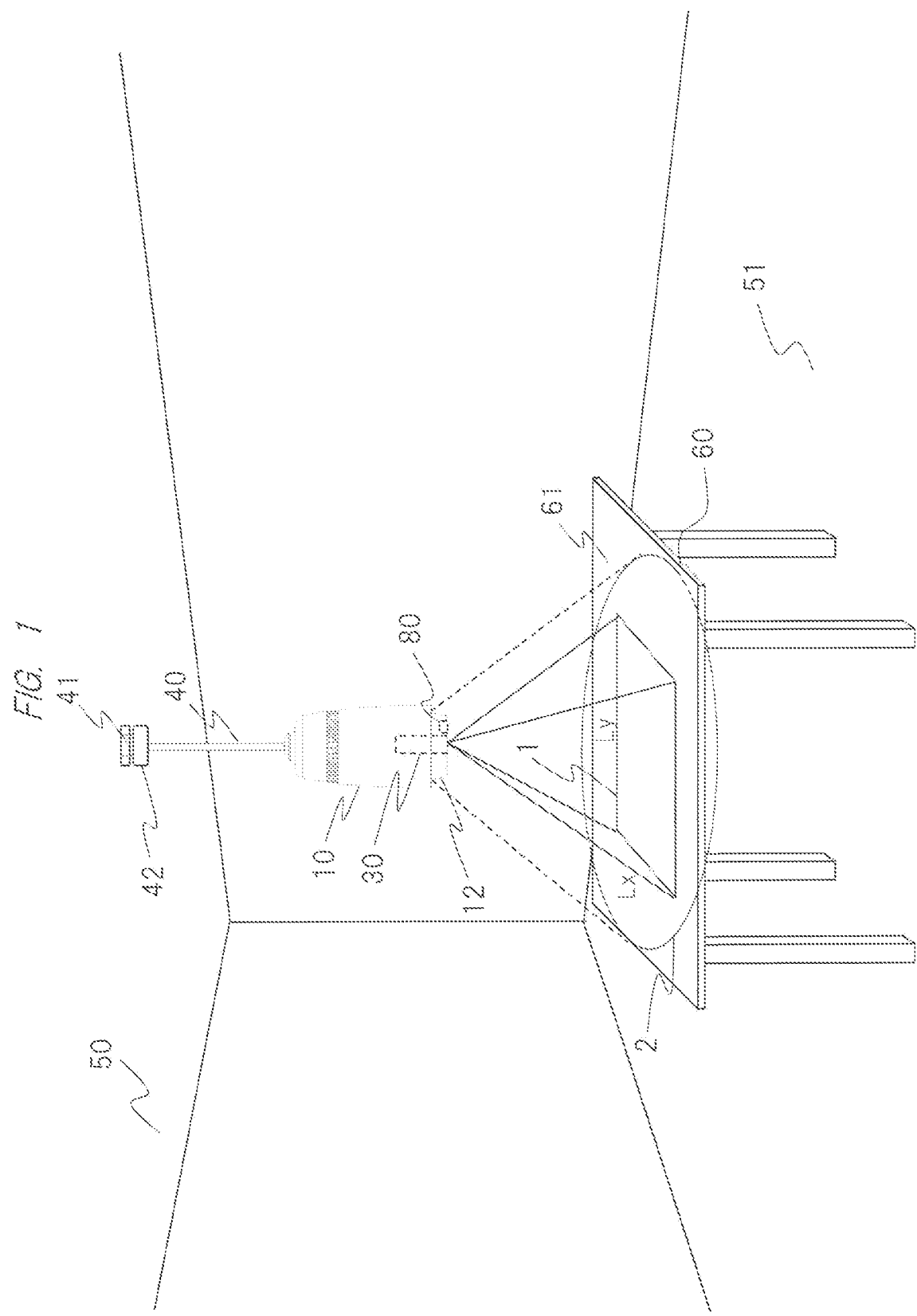

FIG. 1 first illustrates an illuminating apparatus according to a first embodiment of the present invention, that is, a so-called pendant type illuminating apparatus with a video projecting function, which is to be installed in such a form that the illuminating apparatus is hung from a ceiling surface. A video projecting apparatus (that is, a so-called projector) is integrally mounted in the illuminating apparatus. However, the present invention is not limited to this. For example, the present invention can be applied to a so-called ceiling type illuminating apparatus that is installed on the ceiling surface or an illuminating apparatus that is installed on a wall surface.

As is apparent from FIG. 1, an illuminating apparatus 10 with a video projecting function according to the first embodiment of the present invention is an illuminating apparatus suitable for a so-called digital signage, which is a system that transmits information in every place such as a store or a public space, for example. Hereinafter, an example that the illuminating apparatus 10 with the video projecting function is installed in a store will be described as one example.

Specifically, as illustrated in FIG. 1, the illuminating apparatus 10 is installed on a ceiling surface 50 or the like, and placed at a predetermined height for usage. The ceiling surface 50 constitutes a space in a room above a desk or table 60 placed on a floor 51 in a room. The illuminating apparatus 10 with the video projecting function is an illuminating apparatus that has both an illuminating function to illuminate illumination light onto a top board 61 such as the desk or table 60, and a video projecting function to project and display various kinds of video onto the top board 61 such as the desk or table 60. A reference numeral 41 in FIG. 1 denotes a hook ceiling body that is an attachment tool attached to the ceiling surface 50. A reference numeral 42 denotes a ceiling plug (or ceiling cap) that is to be connected to the hook ceiling body. A reference numeral 40 denotes a power cable that holds the illuminating apparatus 10 in a state where the illuminating apparatus 10 is hung from the ceiling surface 50 at a predetermined position and supplies necessary electric power to the illuminating apparatus 10. In addition, in FIG. 1, an x-axis direction and a y-axis direction of a video surface 1, which is projected onto the top board 61 as a display surface are respectively indicated by Lx and Ly. Further, an illumination area of the illumination light is denoted by a reference numeral 2. Further, reference numerals 30 and 80 respectively denote a projector that is a video projecting apparatus and a motion detector (human detecting sensor), which will be described in detail later.

Figure 2B:
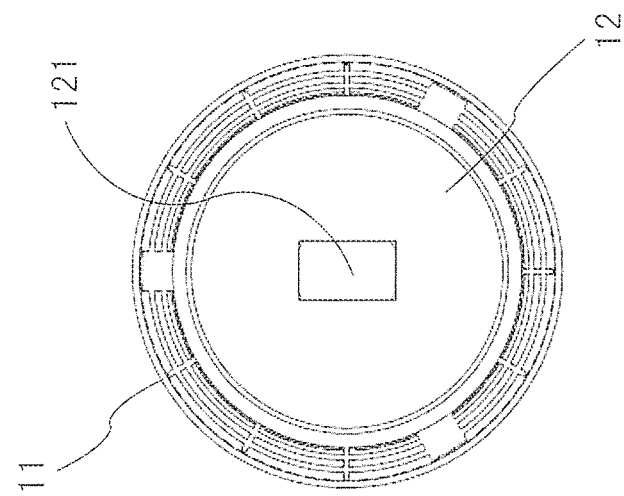
Figure 2A:
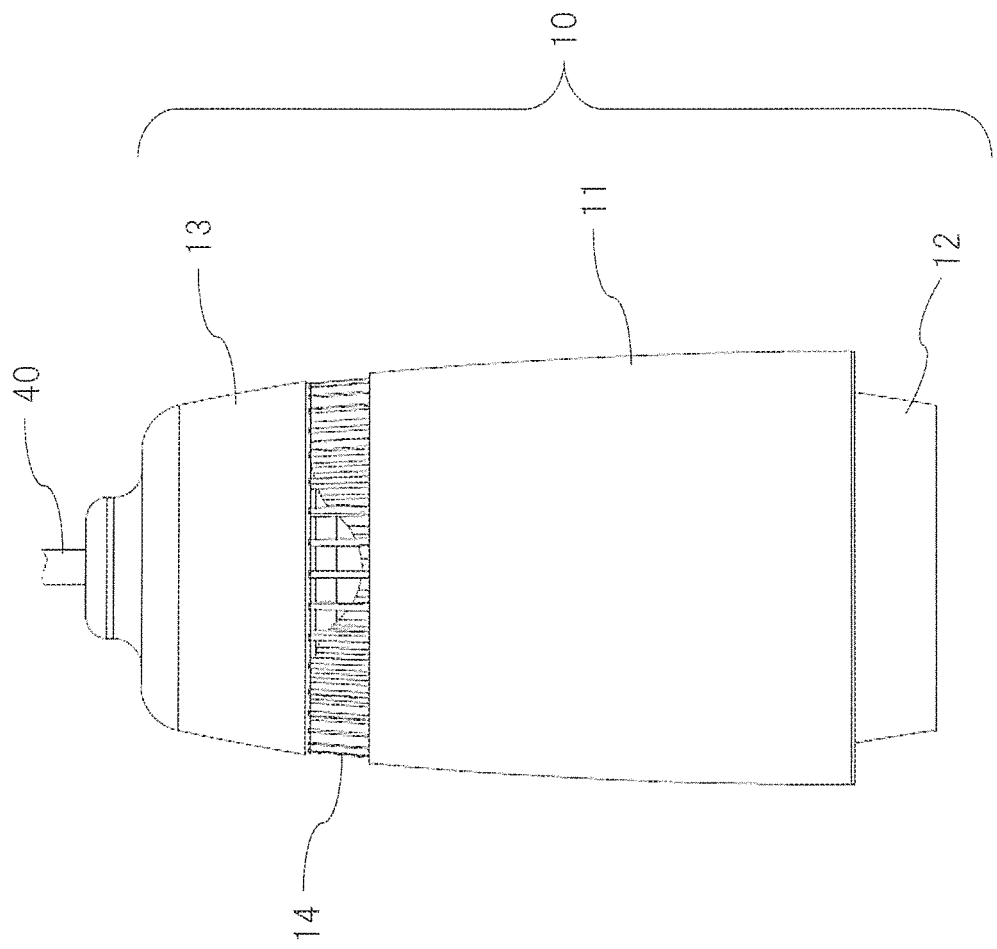

Next, FIGS. 2(A) and 2(B) are respectively a side view and a bottom view illustrating appearance of the pendant type of the illuminating apparatus 10 with the video projecting function. FIG. 3 is a development perspective view of an internal configuration thereof. As are apparent from FIGS. 2(A) and 2(B), in the present embodiment, a disk-shaped illumination light source board 22 (see FIG. 3) is installed on a bottom face portion of the inside of a housing (or shade) 11 that is a body. The illumination light source board 22 constitutes an LED illuminating unit in which a plurality of semiconductor light emitting devices (LEDs) are mounted on a lower surface thereof. Illumination light from the illumination light source board 22 is projected onto the top board 61 such as the desk or table 60 via a diffuser plate 12 provided on a bottom face of the housing (or shade) 11. On the other hand, the projector 30 that is a video projecting apparatus is installed and fixed in an installing member 20 composed of a metallic housing. The installing member 20 is fixed inside the housing (or shade) 11. Video light projected from an emission port thereof is projected onto the top board 61 such as the desk or table 60 via an opening 121. The opening 121 is opened at a substantially central part of the diffuser plate 12 provided on the bottom face of the housing (or shade) 11.

Moreover, as illustrated in FIGS. 1 to 3, in the present embodiment, openings 14 are formed by a louver on an upper portion of the housing (or shade) 11. According to this, for example, as illustrated in FIG. 3, air inside the housing 11 can be discharged to the outside by installing a fan 70 at an upper portion in the housing (or shade) 11. This makes it possible to prevent internal components from rising of temperature in the housing 11. Further, a reference numeral 35 in FIG. 3 denotes a power supply unit configured to convert commercial AC power from the power cable 40 into a necessary DC power source to supply the DC power to the illumination light source board 22 as the LED illuminating unit and the projector 30.

A motion detector 80 is further provided in the illuminating apparatus 10 described above. Arrangement and settings of the motion detector 80 will be described below with reference to FIG. 4.

The motion detector 80 detects approach of a human body H, and causes the illuminating apparatus 10 with the video projecting function described above to carry out an operation suitable for the digital signage. As one example, in an example illustrated in FIG. 4, a case where a height of the table 60 is 70 cm and the illuminating apparatus 10 is disposed at a height of 75 cm from a substantially central part of the table 60 is illustrated. Here, in order to allow approach to be detected when a human body H including a child or an adult approaches the table 60 up to about 150 cm from the central part of the table 60, a detecting area by the motion detector 80 is set so as to spread out downward with an angle θ of about 60°, for example. Further, an "LED illuminating area" by the illuminating apparatus 10 described above and a "projector projecting area" by the projector 30 that is the video projecting apparatus are respectively illustrated by broken lines in FIG. 4.

Figure 5:
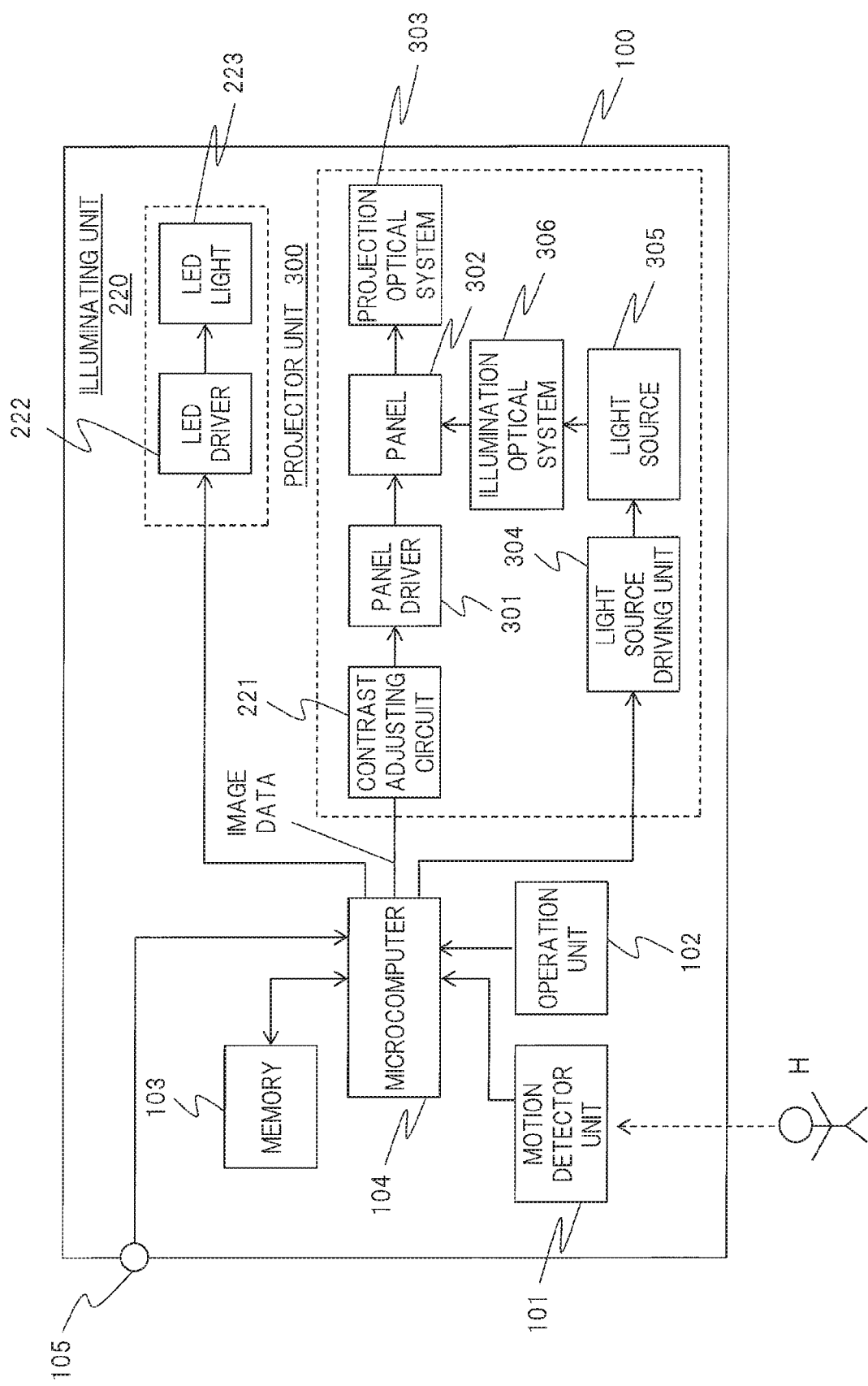
FIG. 5 is a block diagram illustrating one example of a controller for controlling an operation of the illuminating apparatus with the video projecting function according to the first embodiment of the present invention.

Subsequently, FIG. 5 illustrates one example of a controller 100 configured to control operations of the illumination light source board 22 ("illuminating unit"), which is a component in the illuminating apparatus 10 with the video projecting function described above, and the projector 30 ("projector unit"), which is the video projecting apparatus. The controller 100 is installed and fixed in the installing member 20 illustrated in FIG. 3, for example.

This controller 100 is configured by a motion detector unit 101, an operation unit 102, a microcomputer 104, and the like. The motion detector unit 101 is configured to receive a detection signal form the motion detector 80 described above. The operation unit 102 is installed in a wall in the room (not illustrated in the drawings herein), and is configured to receive an operational signal from an operation unit through which a user operates the illuminating apparatus 10 described above. The microcomputer 104 includes a memory 103. The microcomputer 104 is configured to control operations of the illumination light source board 22 ("illuminating unit") and the video projecting apparatus 30 (that is, the "projector unit") on the basis of the signals received by the motion detector unit 101 described above and/or the operation unit 102.

More specifically, as illustrated in FIG. 5, the microcomputer 104 outputs image data for the digital signage to a projector unit 300. The projector unit 300 projects and displays video onto an upper surface of the table 60 on the basis of the inputted image data by the video projecting apparatus 30. For example, after image data from a terminal 105 or image data stored in the memory 103 are sent to a contrast adjusting circuit 221 via the microcomputer 104, a panel driver 301 forms video to be projected onto a panel 302. The panel 302 is configured by a liquid crystal panel, a DMD (digital micromirror device), or the like. At the same time, the microcomputer 104 drives a light source 305 via a light source driving unit 304 on the basis of a control signal of the microcomputer 104. The light source 305 causes a projection optical system 303 to illuminate the panel 302, thereby driving the projection optical system 303.

Further, the microcomputer 104 drives the semiconductor light emitting device (LEDs) mounted on the disk-shaped illumination light source board 22 described above via an LED driver 222 of an illuminating unit 220, thereby putting the LED light 223 on.

Figure 6:
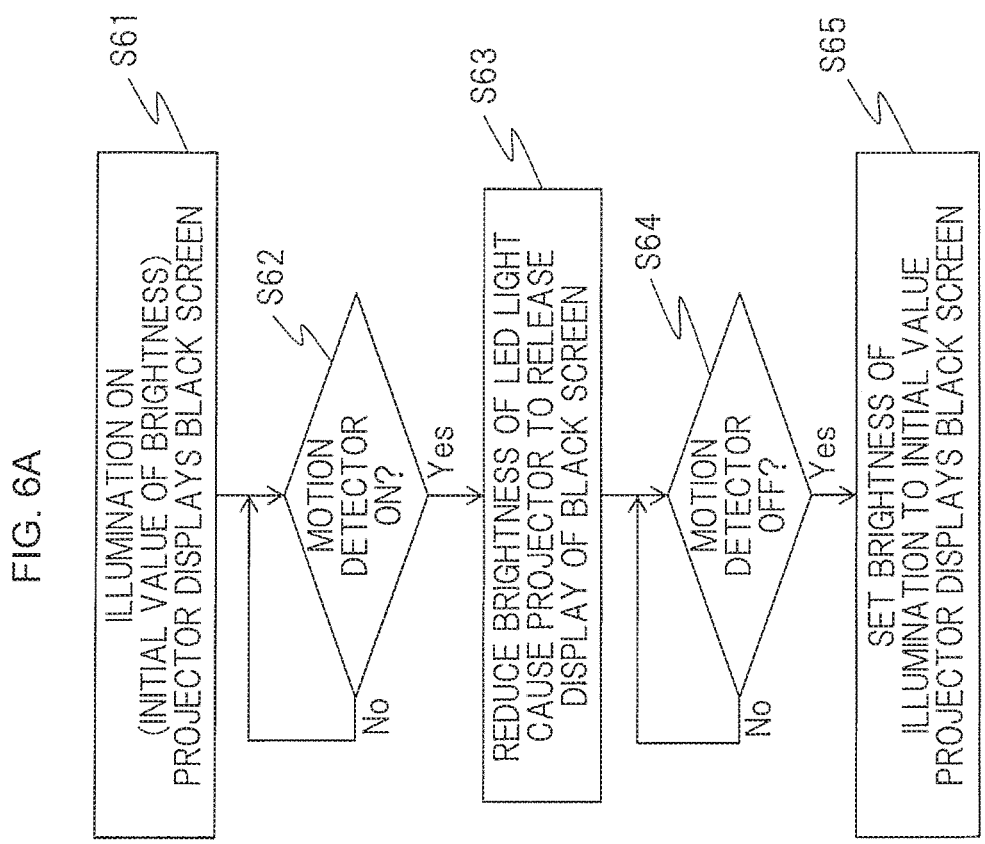

Next, an operation of the illuminating apparatus 10 with the video projecting function according to the present invention, whose configuration has been described above, particularly, an operation for the digital signage will be described in detail with reference to FIG. 6. FIG. 6(A) is a flow illustrating an operation of the illuminating apparatus 10. The operation thereof is carried out by executing a process for image data inputted from the terminal 105 illustrated in FIG. 5 or image data stored in the memory 103 in advance, for example, by the microcomputer 104. Namely, the illuminating apparatus 10 generally turns ON an LED on the illumination light source board 22 (that is, the LED light 223 illustrated in FIG. 5) for illuminating, that is, sets brightness of the LED to an initial value. The illuminating apparatus 10 also causes a projector unit 30 to display a black screen (that is, inserts the black screen onto an output of the projector unit 30) at the same time (Step S61).

Then, when the human body H approaches and enters the detecting area, the motion detector 80 described above generates a detection signal against the human body H (that is, becomes "motion detector ON (the motion detector 80 detects the human body H)") (Step S62).

The illuminating apparatus 10 reduces brightness of the LED light 223, and releases the projector unit 30 described above from a state where the black screen is inserted at the same time (Step S63). Then, when the detection signal from the motion detector 80 indicates OFF, that is, when the human body H goes away from the predetermined area Step S64), the illuminating apparatus 10 again sets brightness of the LED light to the initial value in the similar manner to that at Step S61 as described above, and causes the projector unit 30 to become the state where the black screen is inserted at the same time (Step S65).

Note that FIG. 6(B) illustrates projector illuminating information that is video information of the projector unit 30 at this time. As is apparent from FIG. 6(B), the projector illuminating information indicates the state where the black screen is inserted when the motion detector 80 stops detecting the human body H, that is, "the motion detector OFF (the motion detector 80 does not detect the human body H)". Then, this state where the black screen is inserted continues until the motion detector 80 will detect a human body next time, that is, "the motion detector ON".

As described above, in the illuminating apparatus 10 with the video projecting function according to the present invention, brightness of the LED light is to be reduced in a case where the motion detector 80 detects a human body ("the motion detector ON"). Hereinafter, this will be described. FIG. 7 illustrates, by a vertical axis, the degree of visual deterioration of an image while changing, by a horizontal axis, the degree of superimposition of the LED light at this time, specifically, a rate that the LED light is superimposed from 0% to 100% on the basis of illuminance when an image of white with 100% is projected. As illustrated in FIG. 7 by a curved line, when the degree of superimposition of the LED light becomes larger, for example, it exceeds 50%, deterioration of the image (or video) projected and displayed onto the upper surface of the table 60 by the projector unit 30 that is the video projecting apparatus becomes larger. This is not suitable for the digital signage. Note that, according to results of various types of experimentation by the inventors, the degree of visual deterioration of the image due to the degree of superimposition of the LED light depends upon a type of the image, but generally has an upper limit (allowable upper limit) of about 20%.

Thus, in the present invention, as illustrated in FIG. 5, the LED driver 222 that constitutes the illuminating unit 220 adjusts illuminance of LED light so that the degree of superimposition of the LED light with respect to a projector projecting surface is in a desired range. Note that FIG. 8 illustrates one example of the projector projecting surface obtained from this and an LED illuminating surface. In this example, brightness of the projector projecting surface is 1000 lx, while brightness of the LED illuminating surface becomes 200 lx or lower. The illuminance of the LED light with respect to illuminance of the projector projecting surface is set to 20% (the allowable upper limit) or less.

Moreover, FIG. 9 illustrates a change in the brightness of the projector projecting surface and a change in the brightness of the LED light in a case where the human body H enters the inside including the detecting area by the motion detector 80 described above from the outside of the detecting area. As is apparent from FIG. 9, in a case where the area of the motion detector 80 is outside the LED illuminating surface, LED light is set to an initial setting value, and the projector projecting surface becomes a state where a black screen is inserted. When the human body H enters the area of the motion detector 80, projection of an image by the projector 30 is turned ON, and a control to darken illumination by the LED light is executed at the same time. For example, the LED driver 222 controls the LED light 223 so that illuminance of a brightness signal of white with 100% by the projector 30 is 1000 lx on the top board 61 and illuminance of the LED light 223 becomes 200 lx or lower.

Second Embodiment

Next, FIG. 10 and FIG. 11 illustrate a configuration of an illuminating apparatus 10' with a video projecting function according to another embodiment (that is, a second embodiment) of the present invention. As is apparent from FIGS. 10 and 11, in the second embodiment, in addition to the configuration according to the first embodiment described above, a light source (hereinafter, referred to as an "indirect illumination light source") 25, which consists of LEDs for indirect illumination, is provided at a position adjacent to an opening 14 formed at an upper portion of a housing (or shade) 11. Light is illuminated to a diffuser plate 26 installed on a bottom face of an upper housing 13 to obtain indirect illumination to be bright generally uniformly. According to such a configuration, illumination light of an illumination light source board 22, which is obtained via a diffuser plate 12 provided on a bottom face of the housing (or shade) 11, directly illuminates a top board 61 of a table 60. On the other hand, light uniformized by the diffuser plate 26 described above slightly illuminates the surroundings thereof from the opening 14 provided at the upper portion of the shade 11 as indirect illumination light (see arrows in FIGS. 10 and 11), but does not directly illuminate the top board 61.

Further, FIG. 12 illustrates a configuration of a controller 100' configured to control an operation of the illuminating apparatus 10' according to the second embodiment together with the above configuration. Namely, the controller 100' includes an illuminating unit 220 for the illumination light source board 22, and an indirect illuminating unit 250 for the indirect illumination light source 25. Here, the illuminating unit 220 is configured so that the microcomputer 104 causes the LED driver 222 to turn the LED light 223 on.

An operation of the illuminating apparatus 10' with the video projecting function according to the second embodiment of the present invention whose configuration has been described above will be described in detail with reference to FIG. 13. FIG. 13(A) illustrates a flow illustrating the operation of the illuminating apparatus 10'. Namely, the illuminating apparatus 10' normally turns the LEDs on the illumination light source board 22 that carries out illumination (that is, the LED light 223 in FIG. 5) ON, and set its brightness to an initial value. The illuminating apparatus 10' turns the indirect illumination by the indirect illumination light source 25 ON, and sets a projector unit 30 to a state where a black screen is inserted at the same time (Step S131).

Then, when a human body H approaches and enters a detecting area, a motion detector 80 generates a detection signal against the human body H (that is, becomes "motion detector ON") (Step S132). The illuminating apparatus 10' keeps the indirect illumination ON, and sets brightness of the LED light to an OFF state. The illuminating apparatus 10' releases the projector unit 30 described above from the state where the black screen is inserted at the same time (Step S133). Then, when the detection signal from the motion detector 80 is turned OFF, that is, when the human body H goes away from predetermined area (Step S134), the illuminating apparatus 10' returns brightness of the LED light to the initial value again in the similar manner to that at Step 5131, and turns the indirect illumination ON. The illuminating apparatus 10' sets the projector unit 30 to the state where the black screen is inserted at the same time (Step S135).

Note that FIG. 6(B) illustrates projector illuminating information that is video information of the projector unit 30 at this time. This projector illuminating information becomes the state where the black screen is inserted when the motion detector 80 stops detecting a human body, that is, "the motion detector OFF". Then, the state where the black screen is inserted continues until the motion detector 80 will detect a human body next time, that is, "motion detector ON".

FIG. 14 illustrates one example of a projector projecting surface and an LED indirect illumination surface obtained by this. Here, brightness of the projector projecting surface is 1000 lx, while brightness of the LED indirect illumination surface is almost 0 lx. Illuminance of the LED light with respect to illuminance of the projector projecting surface is set to 20% or lower. An upper limit of the degree of superimposition (allowable upper limit) of the LED light described above is 20%.

Note that this LED indirect illumination is always turned ON, whereby information is projected onto the top board 61 of the table 60 while having a function as illumination. It is possible to recognize lighting equipment when viewed from a distance. On the other hand, the information is transmitted to a person who is positioned near the table 60 via the motion detector 80. The LED light does not illuminate the top board 61 of the table 60 at that time. Therefore, it is possible to provide information in a state where there is no influence on the projected information. This allows the illuminating apparatus 10' to serve as a digital signage.

As described above in detail, according to the illuminating apparatus with the video projecting function of the embodiments of the present invention, it is possible to provide desired illumination light (including indirect illumination light) in a space in a room such as a store or a public space. It is also possible to automatically start various kinds of video information by the projector unit 30 that is the video projecting apparatus on the basis of detection of a human body by the motion detector 80 ("motion detector ON"). At that time, by adjusting contrast of video to be projected and displayed as illustrated in FIG. 15 in accordance with brightness (or illuminance) of the illumination light described above, for example, visual deterioration of a displayed image due to the illumination light is prevented. This allows an illuminating apparatus suitable for a so-called digital signage, which is a system that has excellent visibility for displayed video information and transmits information in a place such as a store or a public space.

As described above, the illuminating apparatus with the video projecting function according to the various embodiments of the present invention has been described. However, the present invention is not limited to the embodiments described above, and various modifications are contained. For example, the whole system has been explained in detail in the embodiments described above for explaining the present invention clearly. The present invention is not necessarily limited to one that includes all configurations that have been explained. Further, a part of the configuration of one embodiment can be replaced by a configuration of the other embodiment. Further, a configuration of the other embodiment can be added to a configuration of one embodiment. Moreover, a part of the configuration of each of the embodiments can be added to the other configuration, deleted or replaced thereby.

REFERENCE SINGS LIST 10, 10' . . . illuminating apparatus, 11 . . . housing (shade), 14 . . . opening, 22 . . . illumination light source board, 30 . . . projector (video projecting apparatus), 80 . . . motion detector, 100, 100' . . . controller, 101 . . . motion detector unit, 220 . . . illuminating unit, 222 . . . LED driver, 223 . . . LED light, 25 . . . indirect illumination light source, 250 . . . indirect illuminating unit, 252 . . . LED driver, 253 . . . LED light.

The invention claimed is:

1. An illuminating apparatus comprising:
an illumination light source disposed in a housing, the illumination light source being configured to generate illumination light;
a video projecting apparatus disposed in the housing, the video projecting apparatus being configured to generate video light, the video light from the video projecting apparatus being projected into an illumination light area from the illumination light source;
a motion detector configured to detect an approach of a human body; and
a controller configured to:
adjust a degree of superimposition of the illumination light from the illumination light source on an image projected from the video projecting apparatus to be within a predetermined acceptable range based on a detection signal from the motion detector, and
adjust contrast of the image projected from the video projecting apparatus in accordance with the degree of superimposition of the illumination light from the illumination light source on the image projected from the video projecting apparatus based on the detection signal from the motion detector,
wherein when the motion detector detects the approach of the human body, the controller is configured to adjust the degree of superimposition of the illumination light from the illumination light source with respect to the image projected from the video projecting apparatus to be within the predetermined acceptable range.

2. The illuminating apparatus according to claim 1, wherein the degree of superimposition of the acceptable range by the controller is 0 to 20%.

3. The illuminating apparatus according to claim 1, wherein a contrast adjusting function of the controller acts to strengthen contrast of the projected image in a case where the degree of superimposition of the illumination light from the illumination light source becomes large.

4. The illuminating apparatus according to claim 1, further comprising
an indirect illumination light source configured to illuminate indirect illumination light to an outside of the video light from the video projecting apparatus,
wherein the controller is configured to operate the video projecting apparatus in accordance with the detection signal of the approach of the human body from the motion detector, and adjust the indirect illumination light source so that a degree of superimposition of the indirect illumination light from the indirect illumination light source with respect to an image projected from the video projecting apparatus is within a predetermined acceptable range.

5. The illuminating apparatus according to claim 4, wherein a detecting area of the motion detector is set to be outside at least one of an illumination area of the illumination light from the illumination light source or an illumination area of the indirect illumination light from the indirect illumination light source.

6. The illuminating apparatus according to claim 4, wherein each of the illumination light source and the indirect illumination light source is configured by a semiconductor light emitting device (LED).

7. The illuminating apparatus according to claim 4, wherein the video light from the video projecting apparatus, the illumination light from the illumination light source, and the indirect illumination light from the indirect illumination light source are configured to be projected or illuminated from the housing to an outside thereof.

8. The illuminating apparatus according to claim 7, wherein the indirect illumination light from the indirect illumination light source is set to be directed in a direction different from those of the video light of the video projecting apparatus and the illumination light of the illumination light source.

9. The illuminating apparatus according to claim 1, wherein the motion detector is installed in a bottom of the housing.

10. The illuminating apparatus according to claim 4, wherein the indirect illumination light source is disposed at a part of the housing.

11. The illuminating apparatus according to claim 1,
wherein when the motion detector does not detect the approach of the human body, the controller is configured to set a video light projecting image projected from the video projecting apparatus to become a state where the image is blocked out, and
wherein when the motion detector detects the approach of the human body, the controller is configured to release the state where the video light projected from the video projecting apparatus is blocked out, and adjust a degree of superimposition of the illumination light from the illumination light source with respect to the image projected from the video projecting apparatus to be within a predetermined acceptable range.

12. The illuminating apparatus according to claim 4,
wherein when the motion detector does not detect the approach of the human body, the controller is configured to set a video light projecting image projected from the video projecting apparatus to become a state where the image is blocked out, and
wherein when the motion detector detects the approach of the human body, the controller is configured to release the state where the video light projected from the video projecting apparatus is blocked out, turn the illumination light source off, and keep the indirect illumination light source on.

13. The illuminating apparatus according to claim 1, wherein the controller is configured to operate the video projecting apparatus in accordance with the detection signal of the approach of the human body from the motion detector, and adjust a degree of superimposition of the illumination light from the illumination light source with respect to an image projected from the video projecting apparatus to be within a predetermined acceptable range.

14. The illuminating apparatus according to claim 1, further comprising
an indirect illumination light source configured to illuminate indirect illumination light to an outside of the video light from the video projecting apparatus,
wherein the controller is configured to operate the video projecting apparatus in accordance with the detection signal of the approach of the human body from the motion detector, and adjust the indirect illumination light source so that a degree of superimposition of the indirect illumination light from the indirect illumination light source with respect to an image projected from the video projecting apparatus is within a predetermined acceptable range.

15. The illuminating apparatus according to claim 1, wherein the motion detector is installed in a bottom of the housing.

16. An illuminating apparatus comprising:
an illumination light source disposed in a housing, the illumination light source being configured to generate illumination light;
a video projecting apparatus disposed in the housing, the video projecting apparatus being configured to generate video light, the video light from the video projecting apparatus being projected into an illumination light area from the illumination light source;
a motion detector configured to detect an approach of a human body; and
a controller configured to control an operation of at least one or both of the illumination light source and the video projecting apparatus on a basis of a detection signal from the motion detector, the controller being configured to adjust brightness of the illumination light from the illumination light source,
wherein when the motion detector does not detect the approach of the human body, the controller is configured to set a video light projecting image projected from the video projecting apparatus to become a state where the image is blocked out, and
wherein when the motion detector detects the approach of the human body, the controller is configured to release the state where the video light projected from the video projecting apparatus is blocked out, and adjust a degree of superimposition of the illumination light from the illumination light source with respect to the image projected from the video projecting apparatus to be within a predetermined acceptable range.

17. An illuminating apparatus comprising:
an illumination light source disposed in a housing, the illumination light source being configured to generate illumination light;
a video projecting apparatus disposed in the housing, the video projecting apparatus being configured to generate video light, the video light from the video projecting apparatus being projected into an illumination light area from the illumination light source;
a motion detector configured to detect an approach of a human body;
a controller configured to control an operation of at least one or both of the illumination light source and the video projecting apparatus on a basis of a detection signal from the motion detector, the controller being configured to adjust brightness of the illumination light from the illumination light source; and
an indirect illumination light source configured to illuminate indirect illumination light to an outside of the video light from the video projecting apparatus,
wherein the controller is configured to operate the video projecting apparatus in accordance with the detection signal of the approach of the human body from the motion detector, and adjust the indirect illumination light source so that a degree of superimposition of the indirect illumination light from the indirect illumination light source with respect to an image projected from the video projecting apparatus is within a predetermined acceptable range,
wherein when the motion detector does not detect the approach of the human body, the controller is configured to set a video light projecting image projected from the video projecting apparatus to become a state where the image is blocked out, and
wherein when the motion detector detects the approach of the human body, the controller is configured to release the state where the video light projected from the video projecting apparatus is blocked out, turn the illumination light source off, and keep the indirect illumination light source on.

18. An illuminating apparatus comprising:
an illumination light source disposed in a housing, the illumination light source being configured to generate illumination light;
a video projecting apparatus disposed in the housing, the video projecting apparatus being configured to generate video light, the video light from the video projecting apparatus being projected into an illumination light area from the illumination light source;
a motion detector configured to detect an approach of a human body; and
a controller configured to control an operation of at least one or both of the illumination light source and the video projecting apparatus on a basis of a detection signal from the motion detector, the controller being configured to adjust brightness of the illumination light from the illumination light source,
wherein the controller includes a contrast adjusting function for an image projected from the video projecting apparatus and the brightness of the illumination light from the illumination light source,
wherein when the motion detector does not detect the approach of the human body, the controller is configured to set a video light projecting image projected from the video projecting apparatus to become a state where the image is blocked out, and
wherein when the motion detector detects the approach of the human body, the controller is configured to release the state where the video light projected from the video projecting apparatus is blocked out, and adjust a degree of superimposition of the illumination light from the illumination light source with respect to the image projected from the video projecting apparatus to be within a predetermined acceptable range.

\* \* \* \* \*